United States Patent [19]

Dalhuisen et al.

[11] 3,717,600
[45] Feb. 20, 1973

[54] MAGNESIUM OXIDE DISPERSIONS

[75] Inventors: Albert J. Dalhuisen, Sunnyvale; William H. Deis, Belmont; David C. Burgett, Daly City, all of Calif.

[73] Assignee: Merck & Co., Inc., Rahway, N.J.

[22] Filed: Jan. 13, 1971

[21] Appl. No.: 106,272

Related U.S. Application Data

[63] Continuation-in-part of Ser. Nos. 19,517, March 13, 1970, abandoned, and Ser. No. 78,300, Oct. 5, 1970, abandoned.

[52] U.S. Cl.................260/23 H, 252/182, 252/309, 260/23.3, 260/23.7 H, 260/23.7 M, 260/27 BB, 260/28.5 A, 260/28.5 B, 260/30.6 R, 260/31.2 MR, 260/31.8 DR, 260/33.6 AQ, 260/92.3, 260/887, 260/888
[51] Int. Cl...............................................C08d 9/02
[58] Field of Search.........260/23.7 H, 23.7 M, 92.3, 260/33.6 AQ, 23.3, 23 H; 252/309, 182

[56] References Cited

UNITED STATES PATENTS 3,434,991   3/1969   Aron ................................260/23.7
3,000,841   9/1961   Ware ..............................260/23.7 X

OTHER PUBLICATIONS

"The Neoprenes" by Murray et al., (1963), pgs. 21–31 and 39–41.
"Neoprene Latex" by Carl, (1962), pgs. 125–128.
"Gas Impermeable Fabric Neoprene Coated" by Du-Pont, (1944), 2 pages.
Hackh's Chemical Dictionary, page 777, (1944).

Primary Examiner—Donald E. Czaja
Assistant Examiner—Donald J. Barrack
Attorney—Julian S. Levitt, J. Jerome Behan and I. Louis Wolk

[57] ABSTRACT

MgO in combination with a rubber plasticizer and a surface active agent and/or metallic soap for use in chloroprene polymer compounding and processing.

47 Claims, No Drawings

MAGNESIUM OXIDE DISPERSIONS

This application is a continuation-in-part of U.S. patent application Ser. No. 19,517, filed Mar. 13, 1970 and U.S. patent application Ser. No. 78,300, filed Oct. 5, 1970 all now abandoned.

This invention relates to improvements in the processing of rubber materials. More particularly this invention is concerned with an improved form of magnesium oxide for use in regulating the scorch and cure rate of neoprene rubber formulations. In addition, the MgO material of this invention results in the production of neoprene vulcanizates of excellent quality.

Neoprene is the generic term applied to the group of synthetic elastomers based on the polymers of chloroprene (2-chloro-1,3-butadiene). The group of general purpose neoprene formulations includes broadly two classes, the sulfur-modified (for example, Type G Neoprene) and the nonsulfur-modified (for example, Type W Neoprene). It should be understood that this invention is applicable to all types of chloroprene polymers made by polymerization, for example, in the presence of mercaptans or other modifying (chain transfer) agents such as the dialkyl xanthogen disulfides, or in the presence of sulfur, followed by plasticizing treatment, or by very limited polymerization without agents followed by removal of the unchanged chloroprene monomer. All these processes are fully described in the prior art. See for example U.S. Pat. Nos. 1,950,436; 2,227,517; 2,234,215; and 2,567,117. Neoprene GNA is an example of a G type of neoprene. This particular neoprene is described and its method of manufacture is given at pages 769–771, "Synthetic Rubber," edited by G.S. Whitby, [John Wiley and Sons Inc. (1954)].

The polymers of chloroprene used include both polychloroprene itself and blends using a chloroprene polymer. Likewise, materials used with the chloroprene polymers as antioxidants, plasticizers, curing agents, accelerators, retarders, reinforcing agents, pigments and extenders are well known, as are the quantities which should be used under various circumstances. This prior art is applicable in the present invention.

The use of MgO in the processing of neoprene compounds is well-known. The mechanism by which MgO benefits the vulcanization process is not clearly understood, but the influence it exerts has been briefly described in Whitby "Synthetic Rubber," (1954), pages 775–776 (John Wiley) as providing a balance between processing safety and cure rate when the MgO is combined with other oxides such as zinc oxide. The use of zinc oxide as the sole curing agent produces both a fast cure and a uniform state of cure on extended vulcanization; i.e., such stocks are "flat curing." The limitations of such compounds include a pronounced tendency to be "scorchy," or result in a premature curing of the system. In addition, there results a leveling off of cure at a relatively low point. The use of magnesia as the sole curing agent produces Neoprene compounds which are very slow curing and are safe processing, but in which curing activity tends to persist. In addition, magnesia improves vulcanizate aging properties, presumably by serving as acceptors for the minute amounts of hydrogen chloride which are released from the neoprene during processing, curing and vulcanizate aging. In combination, zinc oxide and magnesia supplement each other to produce well-balanced stocks, the properties of which can be varied, frequently to advantage, by adjustment in the ratio of one oxide to the other.

It is the purpose of this invention to provide a highly reactive MgO preparation for neoprene processing which disperses rapidly and uniformly in the neoprene. The MgO dispersions of this invention, when employed in the processing of neoprene, result in improved Mooney Scorch protection (original and after aging of the unvulcanized compound), and provide improved processing and storage safety of unvulcanized neoprene. Furthermore, the dispersion has no adverse effect on the vulcanizate properties of neoprene. This results in less scrap and allows more latitude and flexibility in the processing and storage of the unvulcanized neoprene. This highly active, readily dispersible MgO formulation is composed of magnesium oxide and at least one surface active agent and/or metallic soap and at least one rubber plasticizer.

MgO is currently employed in both powder and specified dispersed form for use in neoprene processing. However, the MgO dispersions of the invention result in the preparation of products with improved performance regarding Mooney Scorch Protection (original and after aging) when compared with the MgO preparations that are employed at this time in the rubber industry. The MgO dispersions of this invention may be utilized in either the liquid or solid state in the processing of neoprene. For example, the dispersions may be supplied to the neoprene manufacturer in the form of a paste, stick, block or pellet, etc . . . in order that the dispersions may be conveniently utilized in the processing of neoprene. The particular form of the MgO dispersion involves a matter of choice and may be prepared using conventional procedures well known to the art.

It is well known in the industry that MgO, upon exposure to atmospheric moisture and carbon dioxide, is rapidly converted to the carbonate or hydroxide. However, neither magnesium carbonate nor magnesium hydroxide are effective in neoprene vulcanization in the manner in which MgO is effective. Accordingly, care must be continuously exercised to insure that the MgO preparation destined for use in neoprene processing does not experience a loss in activity. Another advantage of the dispersions of the invention relates to its ability to maintain the activity of the MgO over considerable periods of storage without employing the precautions normally confronting the industry.

This invention contemplates utilizing the "neoprene grades" of MgO which are precipitated and calcined after precipitation. In addition to these light calcined, highly surface active forms of MgO, less active types of MgO may also be employed in the practice of this invention. Included within this class of less active MgO materials are heavy calcined types of MgO.

The amount of surface active agent and/or metallic soap to be employed in not critical and highly effective processing agents may be obtained utilizing 2.5 to 50 parts by weight of this material per 100 parts by weight of MgO. The preferred range may vary from 5 to 15 parts per 100 parts by weight of MgO. It should be noted that the system may contain only a single surface active agent or mixtures thereof or only a metallic soap or mixtures thereof.

In addition members of both classes of materials may be combined with each other in order to obtain the operative amount of surface active agent and/or metallic soap. In other words, the amount of surface active agent and metallic soap may each vary within the range of 0 percent through 100 percent with relation to the other.

The amount of MgO-surface active agent/metallic soap and rubber plasticizer to be employed in the processing of neoprene will usually vary from about 2 to 16 parts by weight per hundred parts of rubber. This will include systems where MgO is used as a processing material both with and without the presence of other metallic oxides. For most applications, the recommended level is 4 phr.

In the practice of this invention a plasticizer for rubber is utilized in combination with the MgO and surface active agent and/or metallic soap. The amount of plasticizer to be employed is not critical and may vary from about 5 to 70 parts per hundred parts of MgO. It should be noted that the system may contain either a single plasticizer or mixtures of different plasticizers.

The particular rubber plasticizer that may be employed in the practice of this invention is not critical and includes those plasticizers that are well known and conventionally employed for this purpose by the skilled artisans of the rubber art. In this regard see Morton, "Introduction to Rubber Technology," pages 151–171, Reinhold Publ. Comp. (1964); Murray and Thompson, "The Neoprenes," pages 39–41, DuPont (1963); the plasticizers disclosed therein being incorporated by reference. Included among this class are:

Petroleum Oils, such as paraffinic, naphthenic, and aromatic.
Resin, waxes, and asphalt derived from petroleum oil are also encompassed within this class. Also included are mineral oils;
Esters, such as esters of organic alcohols and polybasic acids;
Resins and polymers, such as aromatic hydrocarbon resins and liquid elastomers, (e.g., polyisobutylene and polybutene);
Oils, pitch and resins obtained from pine trees and coal tar.
Natural fats and oils (vegetable oils, blown oils, fatty acids).
Coumarone indene resins (aromatic and aliphatic hydrocarbon resins which are derived from coal and petroleum oils) [Resins in Rubber, Gardner L. Brown, Pennsylvania Industrial Chemical Corp. (1969), page 104].

As representative members of the petroleum oils one may specifically point to paraffinic petroleum oils such as Cyclolube 2310 (Golden Bear Oil Co.), naphthenic oils such as Shellflex 371 (Shell Chemical Company) and Cyclolube 138 (Golden Bear Oil Company) and aromatic oils such as Bearflex LPO (Golden Bear Oil Company) and Califlux 550 (Golden Bear Oil Company). The esters are exemplified by butyl oleate, dibutylphthalate, and tricresyl phosphate, dioctyl sebacate, trioctyl phosphate and triethylene glycol caprylate. Illustrative of the resins and polymers are Kenflex N, (aromatic hydrocarbon) BRC–22, Para-Flux, Vistanex LM-MH (a non-staining polyisobutylene with a viscosity average molecular weight (staudinger) of 10,000 – 11,700) and the Flosbrenes Fluid SBR polymers which are liquid or fluid copolymers of styrene and butadiene containing approximately 25 percent bound styrene. Of particular interest in this class is Flosbrene 25 MV which has a molecular weight of approximately 5,000 and a viscosity in poises of 4,500 (77° F.) and 550 (113° F.) [The Flosbrenes Fluid SBR Polymers, A.G. Susie and F.J. Sackfield, American Synthetic Rubber Corp.]. Examples of coumarone indene resins which may be employed in the practice of the invention include the Picco resins which are a family of petroleum derived polyindene or coumarone indene type resins. Of particular interest is Picco 6100–1–½ and Piccotex 100 (alphamethylstyrene vinyltoluene copolymer) (molar ratio of 1-alphamethylstyrene to 3-vinyltoluene) [Resins in Rubber, supra, pages 72–75, 86 and Product Data Sheet –079, Pennsylvania Chemical Corp., page 6]. Illustrative of vegetable oils which may be employed in the compounding of chloroprene polymers are linseed oil, rapeseed oil and safflower oil.

The polybutenes are a series of synthetic hydrocarbon polymers obtained by catalytic polymerization of normal and branched chained butenes. They are pale colored liquids of moderate to high viscosity and tackiness. Representative of the class of polybutenes useful in the practice of the invention are the Oronite polybutenes [New Improved Oronite Polybutenes, (1963), California Chemical Corp.]. Of particular interest is Polybutene No. 128.

| | Test method | No. 6 | No. 8 | No. 16 | No. 18 | No. 20 | No. 24 | No. 32X | No. 32 | No. 122 | No. 128 |
|---|---|---|---|---|---|---|---|---|---|---|---|
| Physical properties: | | | | | | | | | | | |
| Condition | Visual | Clear, bright and free from sediment or suspended matter | | | | | | | | | |
| Color, Gardner | ASTM D-1544 | 1 | 1 | 1 | 1 | 1 | 1 | 1 | 1 | 1 | 1 |
| Specific gravity at 60/60° F | ASTM D-287 | 0.846 | 0.862 | 0.880 | 0.888 | 0.891 | 0.898 | 0.905 | 0.908 | 0.915 | 0.917 |
| Number average molecular weight Mechrolab osmometer | SM-180-6 | 330 | 440 | 640 | 730 | 800 | 950 | 1,260 | 1,400 | 2,500 | 2,700 |
| Molecular weight dispersion index | SM-180-6 | | 1.0 | | | | 1.5 | 1.6 | 1.8 | | 2.3 |
| Viscosity at 100° F., SSU | ASTM D-445 and D-446 | 134 | 560 | 5,700 | 9,500 | 16,500 | 40,000 | 104,000 | 123,000 | 715,000 | 890,000 |
| Viscosity at 210°F., SSU | ASTM D-445 and D-446 | 41 | 63 | 250 | 350 | 550 | 1,050 | 2,460 | 2,990 | 15,800 | 19,500 |
| Viscosity index | ASTM D-567 | 66 | 87 | 96 | 103 | 105 | 112 | 116 | 118 | 122 | 122 |
| Flash point, ° F | ASTM D-92 | 270 | 280 | 335 | 335 | 370 | 400 | 485 | 435 | 500 | 510 |
| Fire point, ° F | ASTM D-92 | 295 | 320 | 390 | 415 | 430 | 470 | 560 | 520 | 605 | 615 |
| Pour point, ° F | ASTM D-97 | −60 | −30 | −10 | +5 | +10 | +20 | +35 | +40 | +55 | +65 |
| Loss of heating, percent (5 Hours at 329° F) | ASTM D-6 | | 7.6 | | | | 1.0 | 0.3 | 0.4 | | 0.1 |
| Coefficient of thermal expansion per ° C. (15C–100° C.) | SM-15-23 | 0.00079 | 0.00078 | 0.00074 | 0.00072 | 0.00072 | 0.00070 | 0.00067 | 0.00056 | 0.00063 | 0.00062 |
| Chemical properties: | | | | | | | | | | | |
| Bromine number, g./100 g | SM-20-28 | 44 | 37 | 26 | 24 | 22 | 18 | 14 | 13 | 8 | 7 |
| Neutralization value, mg. KOH/g | ASTM D-664 | 0.01 | 0.01 | 0.01 | 0.01 | 0.01 | 0.01 | 0.01 | 0.01 | 0.01 | 0.01 |
| Organic chloride as chlorine, weight percent | SM-205-12 | 0.007 | 0.004 | 0.003 | 0.003 | 0.003 | 0.003 | 0.003 | 0.003 | 0.002 | 0.002 |

Table – Continued

| | Test method | No. 6 | No. 8 | No. 16 | No. 18 | No. 20 | No. 24 | No. 32X | No. 32 | No. 122 | No. 128 |
|---|---|---|---|---|---|---|---|---|---|---|---|
| Inorganic chlorides and sulfates | ASTM D-878 | None | None | None | None | None | None | None | None | None | None |
| Total sulfur, percent | ASTM D-1552 | 0.01 | 0.01 | 0.01 | 0.01 | 0.01 | 0.01 | 0.01 | 0.01 | 0.01 | 0.01 |
| Carbon residue, percent | ASTM D-189 | None | None | None | None | None | None | None | None | None | None |
| Water content, p.p.m | ASTM D-1533 | 40 | 40 | 40 | 40 | 40 | 40 | 40 | 40 | 40 | 40 |

As indicated above, mixtures of various plasticizers may be employed in the practice of the invention in addition to a single member. It has been found that desirable results are obtained when mixtures are employed, particularly when one of the members of the plasticizer mixture is either a liquid elastomer such as polyisobutylene, polybutene or the Flosbrenes or a coumarone indene resin such as Picco 6100-1-½ or Piccotex 100. The addition of the above plasticizers to the MgO dispersions improves the mixing and extrusion characteristics of the dispersion without affecting the dispersion performance in neoprene. When the liquid elastomers and coumarone indene resins are employed in combination with other plasticizers, they may be used at 0.4–20 parts by weight per hundred parts by weight of MgO.

The properties of typical petroleum oils which are employed as plasticizers are as follows:

SHELLFLEX 371

| | |
|---|---|
| Viscosity, SSU/100°F. | 420 |
| SSU/210°F. | 53.1 |
| Gravity, °API | 26.1 |
| Specific Gravity/60°F. | 0.8978 |
| Pounds/Gallon | 7.476 |
| Color, ASTM | L0.5 ).% |
| Flash Point, c.o.c.,°F. | 420 |
| Pour Point, °F. | −25 |
| Volatility, 22 Hrs./225°F%W | 0.62 |
| Neutralization No. mg. KOH/g | 0.03 |
| Distillation, °F | |
| IBP | 710 |
| 5% | 745 |
| 10% | 757 |
| 50% | 810 |
| 90% | 865 |
| Aniline Point, °F | 209 |
| UV Absorptivity at 260 μ | 0.9 |
| Viscosity-Gravity Constant | 0.840 |
| Refractive Index/20°C | 1.4890 |
| Refractivity Intercept | 1.0423 |
| Molecular Analysis, Clay-Gel, %W | |
| Asphaltenes | 0 |
| Polar Compounds | 0.3 |
| Aromatics | 15.5 |
| Saturates | 84.2 |
| Carbon Atom Analysis,% | |
| Aromatic Carbon Atoms, $C_A$ | 2 |
| Naphthenic Carbon Atoms, $C_N$ | 44 |
| Paraffinic Carbon Atoms, $C_P$ | 54 |
| ASTM Rubber Extending Oil Type | 4 |

| | Califlux 550 | Bearflex LPO | Cyclolube 138 | Cyclolube 4053 | Cyclolube 2310 |
|---|---|---|---|---|---|
| Specific gravity 60° F | 1.0217 | 0.9679 | 0.9573 | 0.9053 | 0.9236 |
| °API gravity | 7.0 | 14.7 | 16.3 | 24.8 | 21.7 |
| Color, ASTM D-1500 | D8.0 | 2.0 | 5 | 3.0 | 3.0 |
| Viscosity, SUS at 100° F | 313,000 | 130 | 2,500 | 539 | 1,430 |
| Viscosity, SUS at 210° F | 475 | 38.1 | 86.3 | 56.6 | 78.9 |
| Pour point, ° F | 90 | −35 | 15 | −20 | 10 |
| Flash point, COC,° F | 465 | 310 | 425 | 400 | 435 |
| Fire point, COC,° F | 515 | 370 | 470 | 455 | 500 |
| Aniline point,° F | | 59.0 | 158 | 204.1 | 195.4 |
| Mixed aniline point,° F | 95.8 | | | | |
| Average molecular weight | 435 | 255 | 411 | 436 | 410 |
| Refractive index 20° C | 1.5843 | 1.5422 | 1.5294 | 1.4936 | 1.5043 |
| Molecular analysis, ASTM D-2006 (Rostler): | | | | | |
| Asphaltenes | None | None | None | None | None |
| Nitrogen bases | 31 | 2 | 10 | 1 | 2 |
| First acidaffins | 22 | 17 | 14 | 4 | 9 |
| Second acidaffins | 38 | 63 | 37 | 26 | 33 |
| Paraffins | 9 | 18 | 39 | 69 | 56 |
| Gel aromatic | 91 | 82 | 61 | 31 | 44 |
| Molecular analysis, ASTM D-2007 (clay-gel): | | | | | |
| Asphaltenes | None | None | None | None | None |
| Polar compounds | 28 | 3 | 10 | 1 | 2 |
| Aromatics | 63 | 77 | 50 | 26 | 40 |
| Saturates | 9 | 20 | 40 | 73 | 58 |
| Neutralization No | 0.04 | 0.03 | 0.04 | 0.04 | 0.03 |
| Viscosity index | −1,146 | −104 | −56 | 43 | 18 |
| Viscosity-gravity constant | 0.9667 | 0.9520 | 0.9020 | 0.8426 | 0.8653 |
| Refractive intercept | 1.0748 | 1.0548 | 1.0526 | 1.0444 | 1.0463 |
| N-d-M: | | | | | |
| Percent $C_A$ | 54 | 38 | 23 | 6 | 10 |
| Percent $C_N$ | 7 | 34 | 37 | 40 | 43 |
| Percent $C_P$ | 39 | 28 | 40 | 54 | 47 |
| Lbs. wt./gal | 8.6 | 8.0 | 7.9 | 7.5 | 7.7 |

The properties of typical mineral oils that are well known as plasticizers are as follows:

| Grade Number | Specific gravity at 15.5° C. or 60° F. | Saybolt viscosity at 37.8° C. or 100° C. | Kinematic viscosity (centistokes) at 37.8° C. or 100° F. | Engler viscosity 20° C. | Engler viscosity 50° C. | ASTM pour pt. (max.) ° C. | ASTM pour pt. (max.) ° F. | Flash pt. COC (min.) ° F |
|---|---|---|---|---|---|---|---|---|
| 350 USP | .880/.895 | 345/355 | 74/77 | 32.0 | 5.6 | −23 | −10 | 430 |
| 85 NF | .845/.860 | 80/90 | 15/18 | 5.0 | 2.0 | −7 | +20 | 370 |

PICCOTEX 100

| | |
|---|---|
| Softening point, ball-and-ring | 100°C. |
| Color, Gardner scale (maximum) | 1 |
| Specific gravity | 1.04 |
| Pounds per gallon, solid resin | 8.67 |
| Gardner viscosity, in toluene at 25°C. | Q at 70 % solids |
| Acid number, less than | 1 |
| Saponification number, less than | 1 |
| Bromine number (electrometric), less than | 1 |
| Ash, less than | 0.1% |
| Refractive index at 25°C. | 1.583 |
| Ozone number | 0 |
| Flash point, °F. | 505 |
| Fire point, °F | 570 |

PICCO 6100-1-½

Petroleum hydrocarbon resin (produced by the homo- and copolymerization of dienes and olefins of the aliphatic, alicyclic, and monobenzenoid arylalkene types from distilates of cracked petroleum stocks.)

| | |
|---|---|
| Color, Coal Tar; max. | 1½ |
| *Melting Point, °C. | 100 |
| Specific Gravity | 1.06 |
| Bromine No. (elec.) | 10.3 |
| Iodine No. (corrected) | 16.4 |
| Refractive index, 25°C. | 1.60 |
| COC Flash Point, °F. | 480 |
| Acid number, max. | 1. |
| Saponification No., max. | 1. |

*Ring and Ball Method

Representative examples of metallic soaps or fatty acid esters of metals that fall within the scope of the present invention are the stearates, oleates, palmitates, ricinoleates and octoates of Ca, Al, Mg, and Fe. Other metals which may be utilized are Zn, Cd, Ba, Pb, Na, K, Li and Ni. Preferred examples of the metallic soaps are Mg stearate, Ca stearate, Al stearate, Fe distearate and Fe tristearate.

The surface active agents contemplated within the scope of this invention are either nonionic or ionic or mixtures thereof. As illustrative of classes of well known materials one may refer to the following:
Nonionic agents
Mono and diglycerides,
Sorbitan fatty acid esters,
Polyoxyethylene sorbitan fatty acid esters,
Polyoxyethylene sorbitol esters,
Polyoxyethylene acids,
Fatty alcohols
Polyethylene glycols,
Nonylphenoxypoly (ethleneoxy) ethanols,
Fatty acid esters of: glycerol, ethylene glycol, di- and polyethylene glycol, propylene glycol,
Tetra esters of pentaerythritol and fatty acids,
Ionic Agents
Alkyl aryl sulfonates It should be noted that the choice of a specific surface active agent is not critical to the practice of the invention, as long as it be either nonionic or ionic and does not interfere with the neoprene vulcanization. Representative surface active agents include the following:

| Compound name | Nonionic agents | Class |
|---|---|---|
| Span 40 | Sorbitan monopalmitate | Sorbitan fatty acid ester. |
| Span 80 | Sorbitan monooleate | Do. |
| Span 85 | Sorbitan trioleate | Do. |
| Tween 20 | Polyoxyethylene (20) | Sorbitan monolaurate.[1] |
| Tween 40 | do | Sorbitan monopalmitate.[1] |
| Tween 60 | do | Sorbitan monostearate.[1] |
| Tween 80 | do | Sorbitan monooleate.[1] |
| Renex 20 | Polyoxyethylene esters of mixed fatty and resin acids. | Polyoxyethylene acids. |
| Tergitol | NPX | Nonylphenyl polyglycol ether. |

[1] Polyoxy ethylene sorbitan fatty acid esters.

| Compound Name | Class |
|---|---|
| Nonionic Agents | |
| Tergitol 15–S–9 | Linear alcohol polyglycol ether |
| Emulphor VN–430 | Polyoxyethylated fatty acid |
| Igepal CO–430 | Nonylphenoxypoly (ethyleneoxy) ethanol |
| Glycerol monostearate | Fatty acid ester of glycerol |
| Glycerol tristearate | Fatty acid ester of glycerol |
| Pentaerythritol tetrastearate | Tetra ester of pentaery-thritol and fatty acids |
| Cetyl stearyl alcohol | Fatty alcohol |
| Carbowax 4000 | Polyethylene glycol |
| Epolene E–14 | Modified low molecular weight polyethylene |
| Ganex V–216 | Modified poly (vinyl-pyrrolidone) |
| Ionic Agents | |
| Atlas G–3300 | Alkyl aryl sulfonate |

For further embodiments of nonionic and ionic agents that may be employed in the practice of this invention, attention is invited to publications such as "-General Characteristics of Atlas Surfactants" (1963) and Detergents and Emulsifiers 1969 Annual, Edited by John W. McCutcheon; the nonionic and ionic agents disclosed therein being incorporated by reference.

Representative examples of combinations of surface active agents, with and without metallic soaps include the following:
(The preferred ratio of the ingredients is indicated in Parenthesis)
Span 80Tween 60 (50/50)
Span 80Tween 80 (60/40)
Span 80/ Tween 80/Ethylene glycol monostearate (25/25/50)
Span 80/ Tween 80/Glycerol monostearate (40/30/30)
Span 80Tween 80/Epolene E-14 (20/15/65)
Span 80/ Tween 80/Ca stearate (40/30/30)
Span 80/ Tween 80/Carbowax 4000 (40/30/30)
Span 80/Ca stearate (60/40)
Span 80/ Al stearate (60/40)
Igepal CO-430/Ca stearate (67/33)
Igepal CO-430/ Al stearate (67/33)

Although the precise reasoning for the highly improved results achieved by the MgO dispersions of this invention is not entirely understood, it is thought that the beneficial effects may be due to the following:

a. Increase in wetting of the MgO particles due to the reduction of the interfacial tension at the interface of MgO and plasticizer. The advantages of this are: faster wet out of the MgO during dispersion preparation, ability to obtain a higher solids content (or a lower viscosity at the same solids content).

b. Increase in the performance (original Mooney scorch and bin age stability) when used in neoprene. This is believed to be due to a reduction of the interfacial tension at the interface of MgO and neoprene rubber, making the MgO more reactive.

The MgO dispersions of the invention may be prepared employing procedures well known in the art. An effective method involves dispersing the MgO in the dispersing medium by vigorous mixing. High shear mixing is desirable. The dispersion can be made at room temperature, but elevated temperatures (80°–120° C.) are preferred. It may be noted that particle size reduction of the MgO (prior to, after, or during making the dispersion) improves the dispersion performance.

All dispersions used in the following examples were prepared in a double arm sigma blade mixer. The mixer has a working capacity of 0.7 gal. and is jacketed for steam heating. The dispersions were prepared by adding all ingredients except MgO, and mixing with heating until a temperature of 100°–105° C. was reached, then the MgO was added and mixing was continued at 100°–105° C. until complete wetting of the MgO by the dispersing medium.

The neoprene compounding was done on a two-roll laboratory rubber mill. The rubber mill has a front roll and a back roll, each six inches in diameter and thirteen inches in length. The front roll is operated at 24 revolutions per minute, and the back roll is operated at 33.6 revolutions per minute. A 7.5 horsepower motor is used to operate the mill. The composition of the neoprene rubber used in the following examples is as follows:

NEOPRENE RUBBER

| | |
|---|---|
| Neoprene GNA | 100 parts |
| Stearic acid | 0.5 |
| MgO powder or dispersion | as shown |
| SRF Carbon Black | 29 |
| Neozone A (N-phenyl-α-naphthylamine, antioxidant) | 2 |
| ZnO | 5 |

The rubber is banded on the front roll of the laboratory mill, and the mill is operated until the band is smooth and free of holes. In succession, stearic acid, MgO (powder or dispersion), carbon black, Neozine A and ZnO are added. Each ingredient is added evenly across the rolls and at a uniform rate and is assimilated into the mix before the next ingredient is added. After mixing, the batch is removed from the mill, weighed, and again placed into the mill. The rolls are set at a distance of 0.030 inches from each other. The stock is passed through the mill six times. During the milling, water having a temperature of 68° F. is passed through the rolls. The stock is then sheeted from the mill.

Mooney Scorch performance was determined with a Monsanto Mooney Rheometer at 127° C. using a small rotor according to ASTM Test Method D1646–63.

The "Neoprene Grade" MgO used in the following examples is Maglite D No. 3231, a light calcined, high surface activity, magnesium oxide produced by Merck & Co., Inc. It has the following typical properties:

| Chemical Analysis | Typical |
|---|---|
| Magnesium oxide MgO | 93.10 % |
| Ignition loss | 4.86 |
| Carbon dioxide $CO_2$ | 0.46 |
| Combined water $H_2O$ | 4.40 |
| Calcium oxide CaO | 0.79 |
| Silicon dioxide $SiO_2$ | 0.27 |
| Chloride Cl | 0.17 |
| Sulfate $SO_3$ | 0.68 |
| Iron oxide $Fe_2O_3$ | 0.03 |
| Aluminum oxide $Al_2O_3$ | 0.10 |
| Manganese Mn | 0.0017 |
| Copper Cu | 0.0002 |
| Acid insoluble | 0.05 |

| Physical Analysis | Typical |
|---|---|
| Appearance | Clean, white, odorless powder |
| Refractive index | 1.64 |
| Specific gravity | 3.32 |
| Weight per gallon | 2.8 lb./gal. |
| Bulk (loose) | 21pcf |
| Screen analysis | |
| Through 100 mesh | 100% |
| Through 200 mesh | 100% |
| Through 325 mesh | 99.5% |
| Primary Particle size, as determined by an electron microscope | |
| Average | 0.086 micron |
| Distribution | |
| 0.00–0.05 micron | 20.9 % |
| TD 0.05–0.10 micron | 48.8 |
| 0.10–0.15 micron | 20.2 |
| 0.15–0.20 micron | 7.1 |
| 0.20–0.25 micron | 3.0 |
| Surface area | 185 m²/gm. |
| Iodine number | 135 |

EXAMPLE I

Dispersion Performance Evaluation

Dispersions of MgO (Maglite D) in a White Mineral Oil (Ramol-85) were made using varying amounts of the surface-active agent Span 80.

Increasing the amounts of Span 80 results in an increase in MgO wetting as is shown by differences in consistency.

| Dispersion Composition (weight %) | | | Consistency at Room Temperature |
|---|---|---|---|
| Maglite D | Mineral Oil | Span 80 | |
| 50 | 50 | 0 | Very dry crumbly paste |
| 50 | 47.5 | 2.5 | Very dry crumbly paste |
| 50 | 42.5 | 7.5 | Soft paste |
| 50 | 37.5 | 12.5 | Semi-liquid paste |

These dispersions were next compounded in a neoprene rubber formulation indicated previously using a laboratory mill; they were used at 4 phr (parts per 100 of rubber). For comparison, Maglite D powder was similarly compounded, and used at 4 and 2 phr. The 2 phr powder adds the same amount of Maglite D to the neoprene, as 4 phr of the 50 percent dispersions of Maglite D.

The performance of the dispersions and powder additions to the neoprene compound was judged from Mooney scorch $t_{10}$ times. The $t_{10}$ is the time required for the Mooney viscosity to increase 10 units above the minimum. Desirably, the $t_{10}$ times for Original Mooney Scorch should be relatively long (similar to what results from the use of Maglite D powder at 4 phr). Next, the unvulcanized compounds were aged during 6 days at 50° C., after which the Mooney viscosity $t_{10}$ time was determined. Desirably, the $t_{10}$ time should change little during bin aging. If the $t_{10}$ times of the original or the bin aged compounds are short, then the rubber processor does not have sufficient time to process and vulcanize his compounds. This results in scrap. Relatively high $t_{10}$ times reduce losses due to scrap and allow less critical conditions for processing and storage of the unvulcanized neoprene compounds.

A comparison of the Mooney Scorch Protection of the above dispersion compositions of the invention (A) (b-d) which contain 2 phr (4 phr × 50 percent) of Maglite D and Maglite D powder (B) at the 2 phr level clearly reveals the beneficial effects produced by the dispersions of the invention. In fact the dispersion of the invention containing 2 phr of Maglite D (A) (d) is decidedly superior to prior art Maglite D powder at the 4 phr level. It should also be noted that the dispersion compositions of the invention (A) (b-d) are distinctly better than the prior art dispersion of Maglite D in mineral oil (A) (a).

Comparable results to those reported above were achieved when other MgO dispersions within the scope of the invention such as the following were tested with respect to their ability to protect against scorch:

| Dispersion composition (weight percent) | | | |
| --- | --- | --- | --- |
| Maglite D | Plasticizer | Surface-active agent or metallic soap | Consistency at room temperature |
| 50 | Mineral oil (Ramol-85) (50%) | None | Very dry, crumbly paste. |
| 50 | Mineral Oil (Raml-85) (42.5%)o | Epolene E-14 (7.5%) | Soft paste. |
| 50 | Petroleum oil, aromatic (Bearflex-LPO) (45%) | Renex 20 (5%) | Do. |
| 50 | do | Atlas G3300 (5%) | Very soft paste. |
| 50 | do | Glycerol monostearate (5%) | Soft paste. |
| 50 | do | Igepal CO-4 0 (5%) | Semi-liquid paste. |
| 50 | do | Ganex V-216 (5%) | Soft paste. |
| 50 | do | Emulphor VN-430 (5%) | Very soft paste. |
| 50 | Kenflex N (45%) | Ethyleneglycol monostearate (5%) | Soft paste. |
| 50 | Butyl oleate (45%) | Cetyl stearyl alcohol (5%) | Stiff paste. |
| 50 | Dibutyl phthalate (45%) | Span 80 (5%) | Soft paste. |
| 50 | Tricresyl phosphate (45%) | do | Do. |
| 60 | Petroleum oil, aromatic (Bearflex-LPO) (32%) | Ferric distearate (8%) | Do. |

EXAMPLE II

The following 50 percent dispersions were used at 4 phr in neoprene:

The beneficial effects on Mooney Scorch, original as well as after bin aging are demonstrated by representative dispersions of the invention. The tests were carried out in accordance with the Dispersion Performance Evaluation discussed above.

| Dispersion composition (weight percent) | | | Original and bin age Mooney scorch protection $t_{10}$ time (minutes) | |
| --- | --- | --- | --- | --- |
| Maglite D | Plasticizer | Surface active agent | Original | After 6 days at 50° C. |
| 50 | Mineral oil (Ramol-85) (42.5%) | Epolene E-14 (7.5%) | 43 | 30 |
| 50 | Petroleum oil aromatic (Bearflex-LPO) (45%) | Atlas G-3300 (5%) | 42 | 33 |
| 50 | do | Glycerol monostearate (5%) | 39 | 32 |
| 50 | do | Emulphor VN-430 (5%) | 42 | 32 |
| 50 | Kenflex N (45%) | Ethyleneglycol monosteatate (5%) | 44 | 31 |

(A) Dispersion Composition (weight %)

Original and Bin Age Mooney Scorch Protection $t_{10}$ time (minutes)

| Maglite D | Mineral Oil | Span 80 | Original | After 6 days at 50°C. |
| --- | --- | --- | --- | --- |
| (a) 50 | 50 | 0 | 42 | 28 |
| (b) 50 | 47.5 | 2.5 | 45 | 30 |
| (c) 50 | 42.5 | 7.5 | 44 | 35 |
| (d) 50 | 37.5 | 12.5 | 45 | 38 |

Maglite D powder was similarly used at the levels indicated:

(B) Maglite D (phr)

Original & Bin Age Mooney Scorch Protection $t_{10}$ time (minutes)

| | Original | After 6 days at 50°C. |
| --- | --- | --- |
| 4 | 40 | 35 |
| 2 | 34 | 23 |

The following is a comparison between a representative prior art MgO dispersion and a dispersion of Maglite D within the scope of the invention.

The prior art dispersion is a soft plastic form which utilizes aliphatic materials as the dispersing medium for the MgO.

Dispersion of Maglite D has the following composition:

| | |
| --- | --- |
| Maglite D | 52.9% |
| Petroleum Oil, Naphthenic (Shellflex 371) | 43.3 |
| Span 80 | 2.4 |
| Calcium stearate | 1.4 |

Each dispersion was compounded at 4 phr in the neoprene formulation and mixed in a laboratory internal mixer (Banbury, type oo) which has a working capacity of 2,000 cc.

The performance of the dispersions is judged from Mooney scorch $t_{10}$ times.

| | Original and Bin Age Mooney Scorch Protection $t_{10}$ time (minutes) | |
|---|---|---|
| | Original | After 6 days at 50°C. |
| Prior Art Dispersion | 36 | 26 |
| Dispersion of Maglite D | 45 | 40 |

This experiment clearly demonstrates that the MgO dispersions of the invention are markedly superior over the prior art dipersions.

Additional examples of representative formulations that may be employed in the practice of the invention are as follows:

| Dispersion Formulations | | % by weight |
|---|---|---|
| (a) | Mg | 53.0 |
| | Shellflex 371 | 43.2 |
| | Ca Stearate | 1.4 |
| | Sorbitan Monooleate | 2.4 |
| (b) | MgO | 55 |
| | Shellflex 371 | 40 |
| | Pentaerythritol tetrastearate | 5 |
| (c) | MgO | 55 |
| | Cyclolube 2310 | 40 |
| | Sorbitan monooleate | 5 |
| (d) | MgO | 55 |
| | Shellflex 371 | 40 |
| | Pentaerythritol tetrastearate | 2.5 |
| | Nonylphenoxypoly(ethyleneoxy) ethanol | 2.5 |
| (e) | MgO | 55 |
| | Shellflex 371 | 30 |
| | Fe Distearate or Tristearate | 15 |

In the above formulations highly desirable results are obtained by replacing 2 parts of oil with 2 parts of coumarone indene resin (e.g., Piccotex 100 or Picco 6100–1–½) or 2 parts of liquid elastomer (e.g., Vistanex LM–MS).

| | |
|---|---|
| MgO | 53.0 |
| Shellflex 371 | 41.2 |
| Piccotex 100 | 2.0 |
| Al Stearate | 1.4 |
| Polyoxyethylene sorbitan monooleate | 2.4 |

Preparation of Stick Form of MgO dispersion

After the dispersion is prepared by high shear mixing, the hot dispersion is extruded through a hot extruder. The extruded stick is then cut into the desired lengths, and cooled to room temperature.

Preparation of Pellet Form of MgO Dispersion

Pellets are prepared by adding the hot dispersing medium to the powder while it is being mixed slowly at abut 100°C. Just enough dispersing medium is added to make the particles coalesce.

When certain representative embodiments and details have been shown for the purpose of illustrating the invention it will be apparent to those skilled in this art that various changes and modifications may be made therein without departing from the spirit or scope of the invention.

What is claimed is:

1. A chloroprene polymer containing a dispersion of MgO which is comprised of MgO and at least one ionic or nonionic surface active agent or mixtures thereof and at least one rubber plasticizer wherein there is from about 2 to about 16 parts of a dispersion of MgO by weight per hundred parts by weight of polymer, the total mount of surface active agent being from about 2.5 to about 50 parts based upon per hundred parts by weight of MgO, and the amount of rubber plasticizer is from about 5 to about 70 based upon per hundred parts by weight of MgO.

2. The chloroprene polymer according to claim 1 wherein the nonionic surface active agent is selected from the group consisting of sorbitan fatty acid esters, polyoxyethylene sorbitan fatty acid esters, polyoxyethylene sorbitol esters, polyoxyethylene acids, fatty alcohols, polyethylene glycols, nonylphenoxypoly (ethyleneoxy) ethanols, fatty acid esters of glycerol, ethylene glycol, polyethylene glycol or propylene glycol, and tetra esters of pentaerythritol and fatty acids and the ionic surface active agent is an alkyl aryl sulfonate or a metallic soap.

3. The chloroprene polymer according to claim 2 wherein the nonionic surface active agent is selected from the group consisting of sorbitan fatty acid esters, polyoxyethylene sorbitan fatty acid esters, nonylphenoxypoly (ethyleneoxy) ethanols, and tetra ester of pentaerythritol and fatty acids and the metallic soap is a stearate of Ca, Al, Mg, or Fe.

4. The chloroprene polymer according to claim 3 wherein the rubber plasticizer is a petroleum oil.

5. The chloroprene polymer of claim 4 wherein the surface active agent is nonylphenoxypoly(ethyleneoxy) ethanol, the rubber plasticizer is a naphthenic petroleum oil and the metallic soap is calcium stearate.

6. The chloroprene polymer according to claim 5 which further contains a coumarone indene resin.

7. The chloroprene polymer of claim 4 wherein the rubber plasticizer is a naphthenic petroleum oil, the surface active agent is sorbitan monooleate and the metallic soap is calcium stearate.

8. The chloroprene polymer according to claim 7 which further contains a coumarone indene resin.

9. The chloroprene polymer according to claim 7 which further contains polyisobutylene.

10. The chloroprene polymer according to claim 4 wherein the rubber plasticizer is a naphthenic petroleum oil and the surface active agent is pentaerythritol tetra stearate.

11. In the method of utilizing MgO in the compounding and processing of chloroprene polymers, the improvement comprising employing a dispersion of MgO which is comprised of MgO and at least one ionic or nonionic surface active agent or mixtures thereof and at least one rubber plasticizer wherein there is from about 2 to about 16 parts of a dispersion of MgO by weight per hundred parts by weight of polymer, the total amount of surface active agent being from about 2.5 to about 50 parts by weight based upon per hundred parts by weight of MgO, and the amount of rubber plasticizer is from about 5 to about 70 parts by weight based upon per hundred parts by weight of MgO.

12. The method according to claim 11 wherein the nonionic surface active agent is selected from the group consisting of sorbitan fatty acid esters, polyoxyethylene sorbitan fatty acid esters, polyoxyethylene sorbitol esters, polyoxyethylene acids, fatty alcohols, polyethylene glycols, nonylphenoxypoly (ethyleneoxy) ethanols, fatty acid esters of glycerol, ethylene glycol, polyethylene glycol or propylene glycol, and tetra esters of pentaerythritol and fatty acids and the ionic surface active agent is an alkyl aryl sulfonate or a metallic soap.

13. The method according to claim 12 wherein the nonionic surface active agent is selected from the group consisting of sorbitan fatty acid esters, polyoxyethylene sorbitan fatty acid esters, nonylphenoxypoly (ethyleneoxy) ethanols, and tetra ester of pentaerythritol and fatty acids and the metallic soap is a stearate of Ca, Al, Mg, or Fe.

14. The method according to claim 13 wherein the rubber plasticizer is a petroleum oil.

15. The method according to claim 14 wherein the rubber plasticizer is a naphthenic petroleum oil, the surface active agent is sorbitan monooleate and the metallic soap is calcium stearate.

16. The method according to claim 14 wherein the rubber plasticizer is a naphthenic petroleum oil and the surface active agent is pentaerythritol tetra-stearate.

17. The method of claim 14 wherein the surface active agent is nonylphenoxypoly (ethyleneoxy) ethanol, the rubber plasticizer is a naphthenic petroleum oil and the metallic soap is calcium stearate.

18. The method according to claim 17 which further contains a coumarone indene resin.

19. The method according to claim 15 wherein the dispersion further contains a coumarone indene resin.

20. The method according to claim 15 wherein the dispersion further contains polyisobutylene.

21. A composition for use in the compounding and processing to chloroprene polymers comprising a dispersion of MgO which is comprised of MgO and at least one ionic or nonionic surface active agent or mixtures thereof and at least one rubber plasticizer, the total amount of surface active agent being from about 2.5 to about 50 parts by weight based upon per hundred parts by weight of MgO, and the amount of rubber plasticizer is from about 5 to about 70 parts by weight based upon per hundred parts by weight of MgO.

22. The composition of claim 21 wherein the nonionic surface active agent is selected from the group consisting of sorbitan fatty acid esters, polyoxyethylene sorbitan fatty acid esters, polyoxyethylene sorbitol esters, polyoxyethylene acids, fatty alcohols, polyethylene glycols, nonylphenoxypoly (ethyleneoxy) ethanols, fatty acid esters of glycerol, ethylene glycol, polyethylene glycol or propylene glycol, and tetra esters of pentaerythritol and fatty acids and the ionic surface active agent is an alkyl aryl sulfonate or a metallic soap.

23. The composition of claim 22 wherein the nonionic surface active agent is selected from the group consisting of sorbitan fatty acid esters, polyoxyethylene sorbitan fatty acid esters, nonylphenoxypoly (ethyleneoxy) ethanols and tetra ester of pentaerythritol and fatty acids and the metallic soap is a stearate of Ca, Al, Mg, or Fe.

24. The composition of claim 23 wherein the rubber plasticizer is a petroleum oil.

25. The composition of claim 24 wherein the rubber plasticizer is a naphthenic petroleum oil, the surface active agent is sorbitan monooleate and the metallic soap is calcium stearate.

26. The composition of claim 25 which further contains a coumarone indene resin.

27. The composition of claim 25 which further contains polyisobutylene.

28. The composition of claim 24 wherein the surface active agent is nonylphenoxypoly(ethyleneoxy) ethanol, the rubber plasticizer is a naphthenic petroleum oil and the metallic soap is calcium stearate.

29. The composition of claim 28 which further contains a coumarone indene resin.

30. The composition according to claim 24 wherein the rubber plasticizer is a naphthenic petroleum oil and the surface active agent is pentaerythritol tetra-stearate.

31. A process of producing a vulcanizable chloroprene polymer which comprises the addition of a dispersion of MgO and at least one ionic or nonionic surface active agent or mixtures thereof and at least one rubber plasticizer wherein there is from about 2 to about 16 parts of a dispersion of MgO by weight per hundred parts by weight of polymer, the total amount of surface active agent being from about 2.5 to about 50 parts by weight based upon per hundred parts by weight of MgO, and the amount of rubber plasticizer is from about 5 to about 70 parts by weight based upon per hundred parts by weight of MgO to a composition comprising chloroprene.

32. The process according to claim 31 wherein the nonionic surface active agent is selected from the group consisting of sorbitan fatty acid esters, polyoxyethylene sorbitan fatty acid esters, polyoxyethylene sorbitol esters, polyoxyethylene acids, fatty alcohols, polyethylene glycols, nonylphenoxypoly (ethyleneoxy) ethanols, fatty acid esters of glycerol, ethylene glycol, polyethylene glycol or propylene glycol, and tetra esters of pentaerythritol and fatty acids and the ionic surface active agent is an alkyl aryl sulfonate or a metallic soap.

33. The process according to claim 32 wherein the nonionic surface active agent is selected from the group consisting of sorbitan fatty acid esters, polyoxyethylene sorbitan fatty acid esters, nonylphenoxypoly(ethyleneoxy) ethanols, and tetra ester of pentaerythritol and fatty acids and the metallic soap is a stearate of Ca, Al, Mg, or Fe.

34. The process according to claim 32 wherein the rubber plasticizer is a petroleum oil.

35. The process of claim 34 wherein the rubber plasticizer is a naphthenic petroleum oil, the surface active agent is sorbitan monooleate and the metallic soap is calcium stearate.

36. The process according to claim 34 wherein the rubber plasticizer is a naphthenic petroleum oil and the surface active agent is pentaerythritol tetra-stearate.

37. The process of claim 35 wherein the dispersible form of MgO further contains a coumarone indene resin.

38. The process of claim 35 wherein the dispersible form of MgO further contains polyisobutylene.

39. The process according to claim 34 wherein the surface active agent is nonylphenoxypoly(ethyleneoxy) ethanol, the rubber plasticizer is a naphthenic petroleum oil and the metallic soap is calcium stearate.

40. The process according to claim 39 which further contains a coumarone indene resin.

41. A stick or pellet for the use in the compounding and processing of chloroprene polymers comprising a dispersion of MgO which is comprised of MgO and at least one ionic or nonionic surface active agent or mixture thereof and at least one rubber plasticizer, the total amount of surface active agent being from about 2.5 to about 50 parts by weight based upon per hundred parts by weight of MgO, and the amount of rubber plasticizer is from about 5 to about 70 parts by weight based upon per hundred parts by weight of MgO.

42. The stick or pellet according to claim 41 wherein the nonionic surface active agent is selected from the group consisting of sorbitan fatty acid esters, polyoxyethylene sorbitan fatty acid esters, polyoxyethylene sorbitol esters, polyoxyethylene acids, fatty alcohols, polyethylene glycols, nonylphenoxypoly(ethyleneoxy) ethanols, fatty acid esters of glycerol, ethylene glycol, polyethylene glycol or propylene glycol, and tetra esters of pentaerythritol and fatty acids and the ionic surface active agent is an alkyl aryl sulfonate or a metallic soap.

43 The stick or pellet according to claim 42 wherein the nonionic surface active agent is selected from the group consisting of sorbitan fatty acid esters, polyoxyethylene sorbitan fatty acid esters, nonylphenoxypoly(ethyleneoxy) ethanols, and tetra ester of pentaerythritol and fatty acids and the metallic soap is a stearate of Ca, Al, Mg or Fe.

44. The stick or pellet according to claim 43 wherein the rubber plasticizer is a petroleum oil.

45. The stick or pellet according to claim 44 wherein the rubber plasticizer is a naphthenic petroleum oil, the surface active agent is sorbitan monooleate and the metallic soap is calcium stearate.

46. The stick or pellet according to claim 44 wherein the surface active agent is nonylphenoxypoly(ethyleneoxy) ethanol, the rubber plasticizer is a naphthenic petroleum oil and the metallic soap is calcium stearate.

47. The stick or pellet according to claim 46 which further contains a coumarone indene resin.

* * * * *

Disclaimer 3,717,600.—*Albert J. Dalhuisen*, Sunnyvale, *William H. Debis*, Belmont, and *David C. Burgett*, Daly City, Calif. MAGNESIUM OXIDE DISPERSIONS. Patent dated Feb. 20, 1973. Disclaimer filed Mar. 14, 1977, by the assignee, *Merck & Co., Inc.*

Hereby enters this disclaimer to claims 1–47 of said patent.

[*Official Gazette May 10, 1977.*]